(12) United States Patent
Dorneanu (10) Patent No.: US 11,953,311 B2
(45) Date of Patent: Apr. 9, 2024

(54) SMART SPRAY FOAM DEPTH SENSOR

(71) Applicant: Daniel Dumitru Dorneanu, Charleston, SC (US)

(72) Inventor: Daniel Dumitru Dorneanu, Charleston, SC (US)

( * ) Notice: Subject to any disclaimer, the term of this patent is extended or adjusted under 35 U.S.C. 154(b) by 849 days.

(21) Appl. No.: 17/019,189

(22) Filed: Sep. 11, 2020

(65) Prior Publication Data

US 2021/0131793 A1 May 6, 2021

Related U.S. Application Data

(60) Provisional application No. 62/873,852, filed on Jul. 13, 2019.

(51) Int. Cl.
*G01B 11/22* (2006.01)
*E04F 21/08* (2006.01)

(52) U.S. Cl.
CPC ............ *G01B 11/22* (2013.01); *E04F 21/085* (2013.01)

(58) Field of Classification Search
CPC ........ G01B 11/22; G01B 11/24; E04F 21/085
See application file for complete search history.

(56) References Cited

U.S. PATENT DOCUMENTS

| | | | | |
|---|---|---|---|---|
| 2018/0283016 | A1* | 10/2018 | Telleria | ................... B24B 49/12 |
| 2019/0265143 | A1* | 8/2019 | Glean | ....................... G01N 9/24 |
| 2021/0372903 | A1* | 12/2021 | Wilson | ...................... G01N 9/00 |

* cited by examiner

*Primary Examiner* — Manuel A Rivera Vargas (57) ABSTRACT

SPF (spray polyurethane foam) insulation applied in a commercial or residential building is an amazing but costly construction product. One reason is that application of SPF insulation requires large investment capital equipment and a specialized crew for each job. The work is further made difficult because determination of the performance and quality characteristics of the performed work is subjective and still dependent on only primitive tools for normal routine examination. We worked to solve this problem by designing, building, and testing a portable measurement and evaluation system capable of reading any, and all SPF substrates with reliable accuracy and repeatability. With this tool, the applicator or inspector can now efficiently and accurately determine the performance and quality characteristics of the spray foam job and make smart strategic decisions on-demand. Using our system, the average applicator can improve his productivity by 15% per job, can reduce his chemical consumption by 10% per job and the improve overall quality metric of the job. Using our system, the average inspector can reduce the inspection time by 80% per job and can increase the accuracy of his inspection by 20% per job.

8 Claims, 12 Drawing Sheets

SMART SPRAY FOAM DEPTH SENSOR

This application claims the benefit of U.S. Application No. 62/463,854 filed Feb. 27, 2017 titled Smart Spray Foam Respirator Mask, the benefit of U.S. Application No. 62/474,657 filed Mar. 22, 2017 titled Spray Foam Insulation Assisted Spray Technology and the benefit of U.S. Application No. 62/873,852 filed Jul. 13, 2019 titled Smart Spray Foam Depth Sensor. The contents of which are hereby incorporated by reference.

TECHNICAL FIELD

Polyurethane Spray Foam Insulation

BACKGROUND

Figure 1:
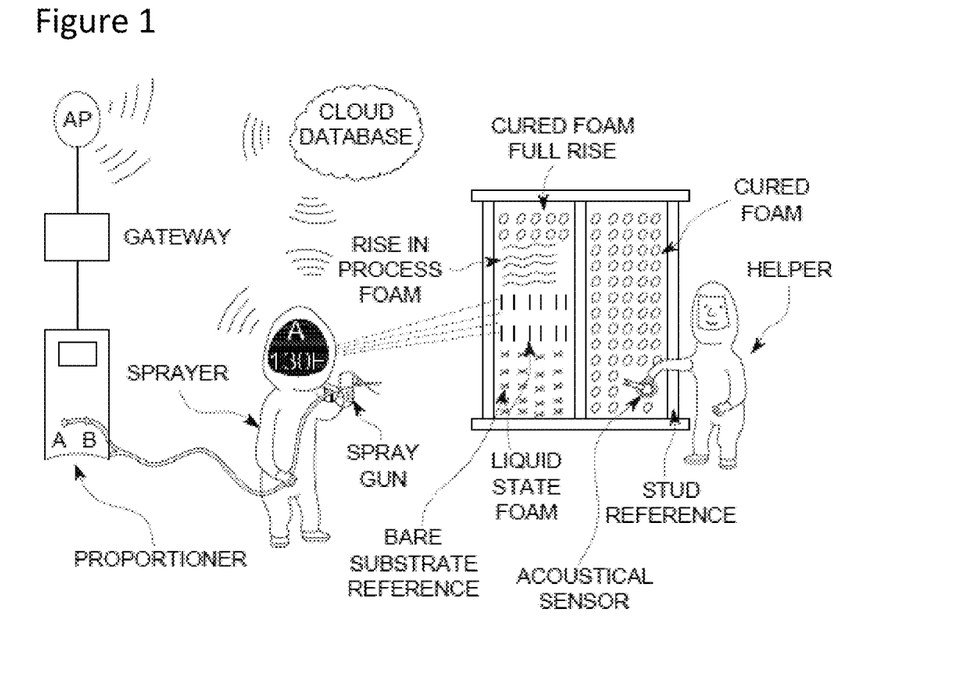
FIG. 1 shows a diagram of the components found typically in the dynamic measurement using the Smart Spray Foam Depth Sensor system.
Figure 2:
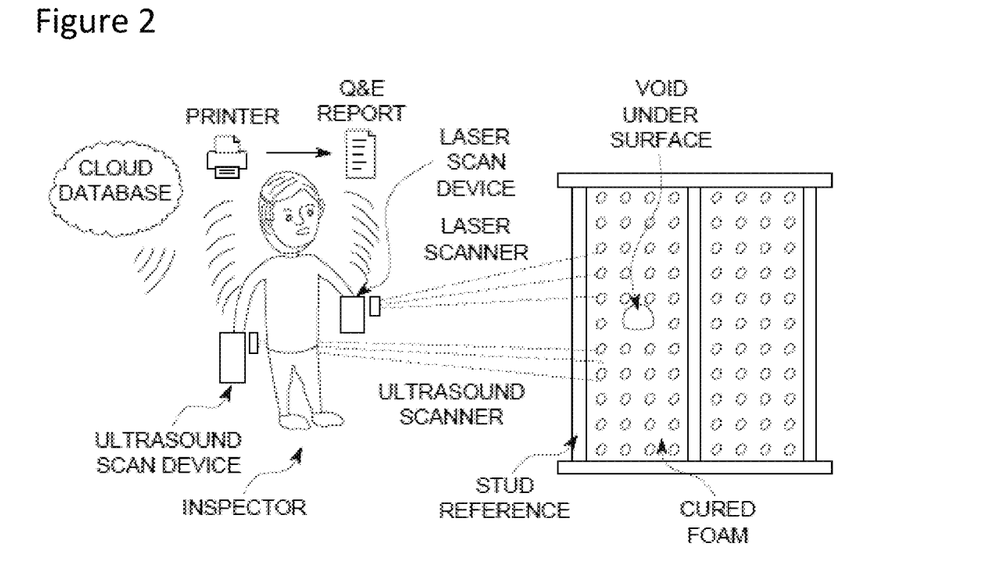
FIG. 2 shows a diagram of the components found typically in the static measurement using the Smart Spray Foam Depth Sensor system.
Figure 7:
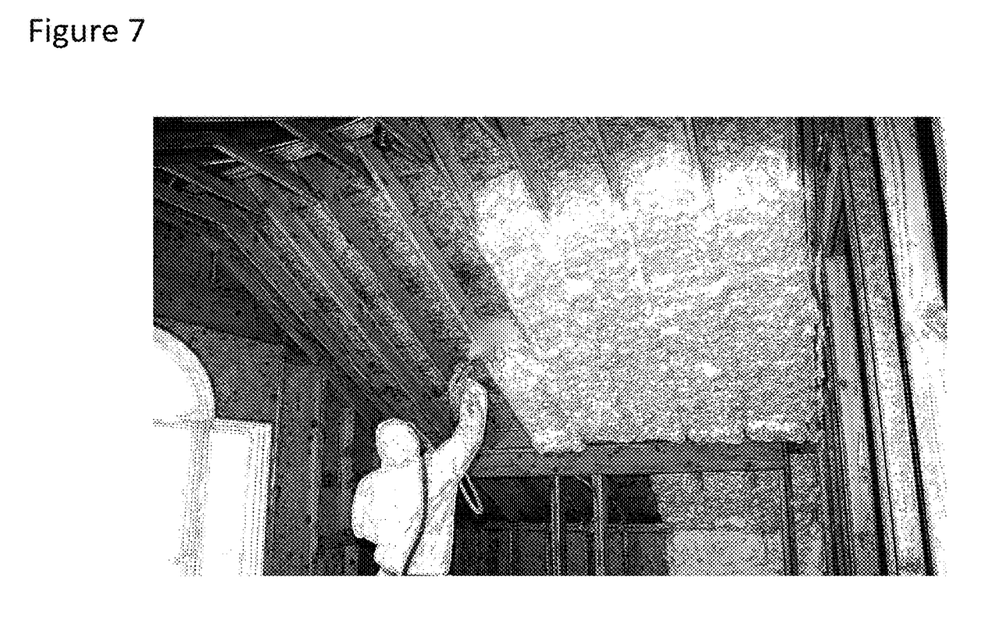
FIG. 7 shows a typical applicator spraying polyurethane spray foam on a residential substrate.
Figure 8:
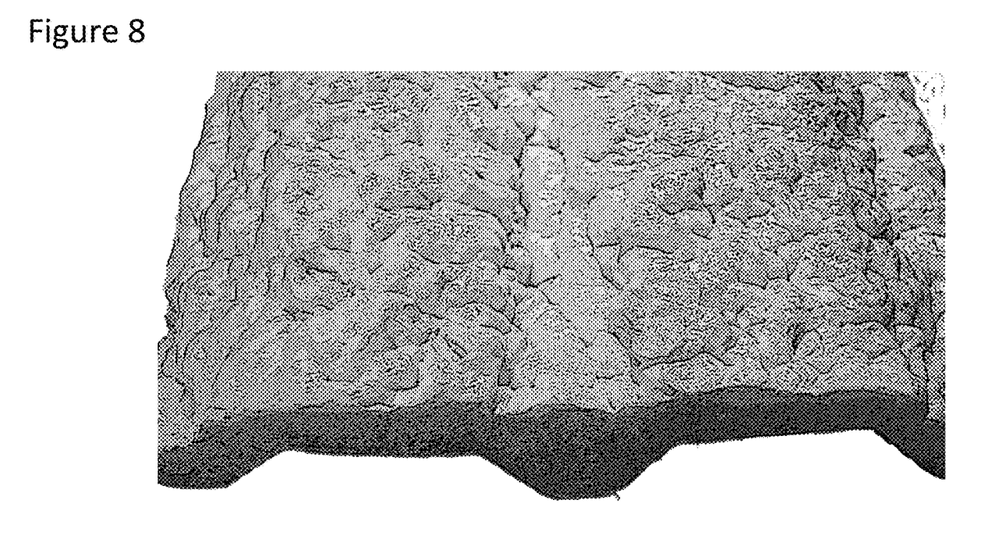
FIG. 8 shows a typical closed cell polyurethane surface.
Figure 9:
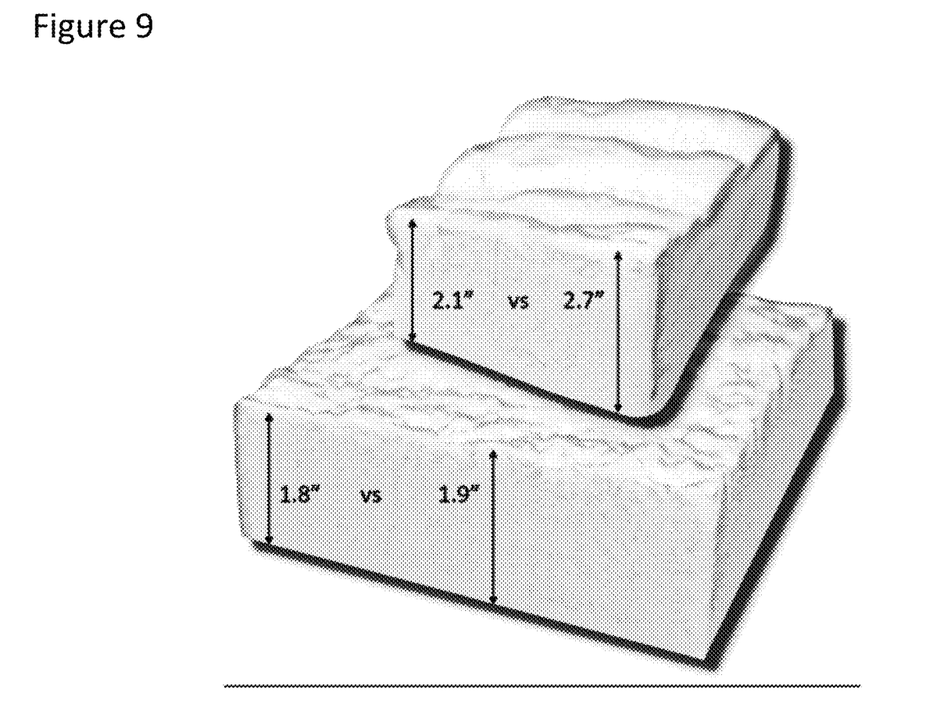
FIG. 9 shows a dimensional variation in a closed cell spray foam cross-section.
Figure 10:
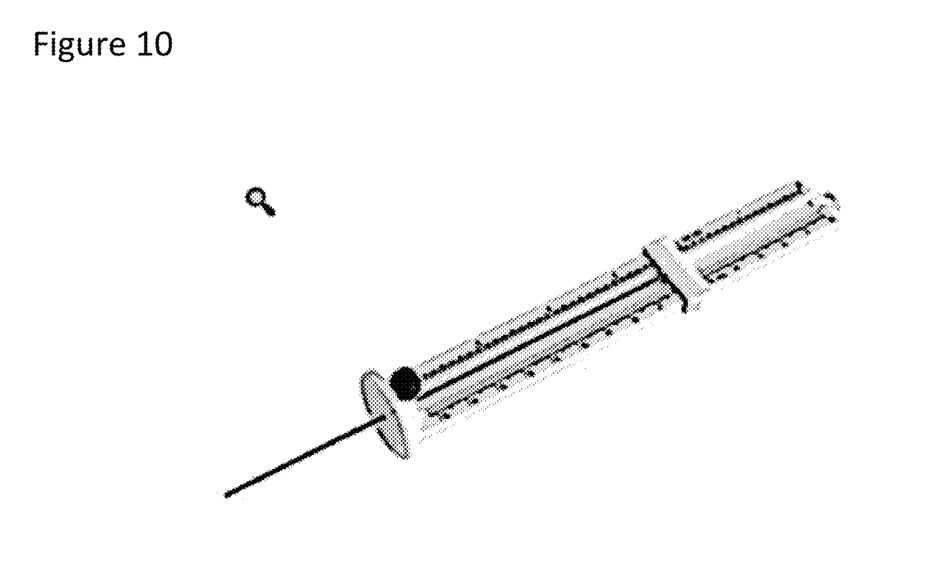
FIG. 10 shows a mechanical depth stick available on the market to measure depths of applied spray foam.
Figure 22:
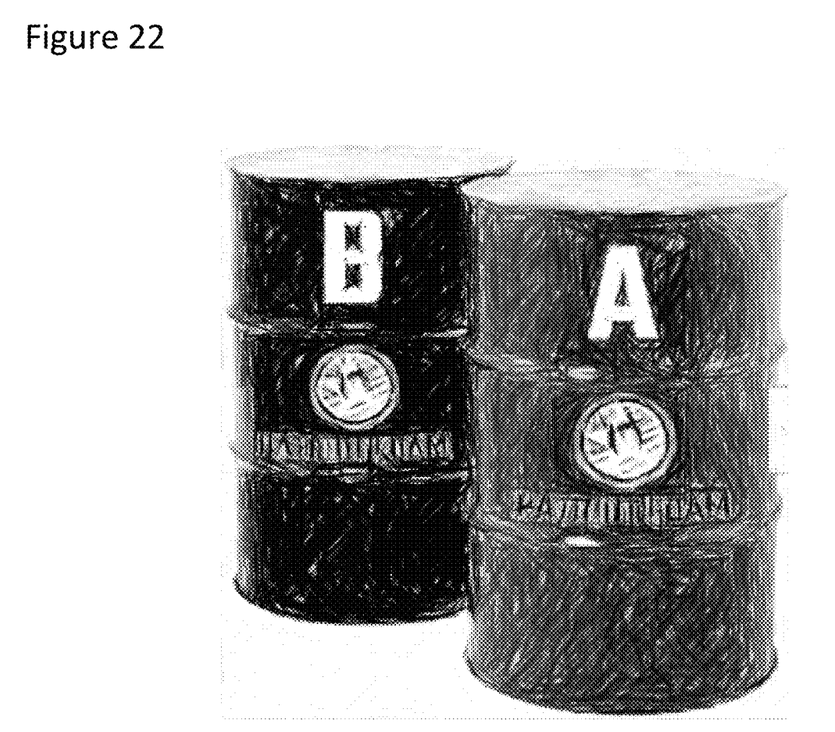
FIG. 22 shows an example of a chemical drum set used in SPF application.
Figure 23:
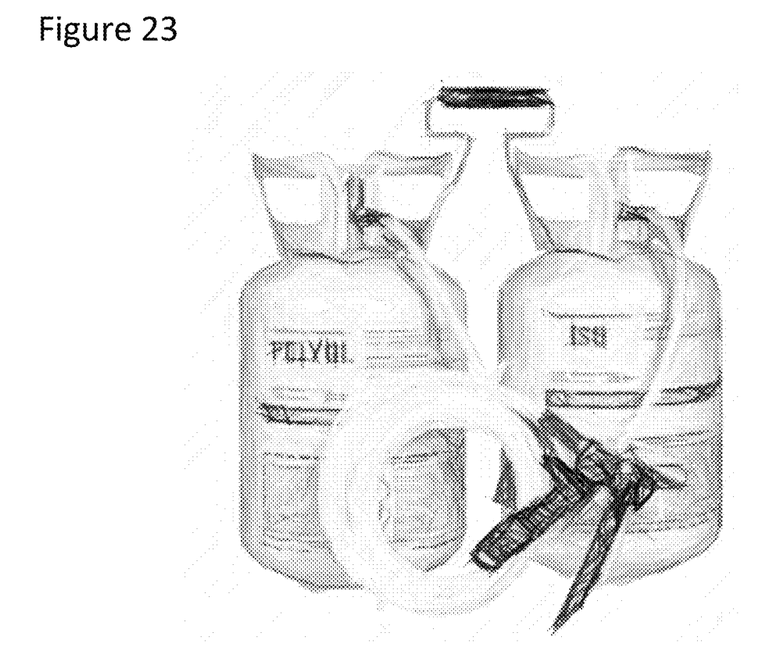
FIG. 23 shows an example of an SPF chemical kit.
Figure 24:
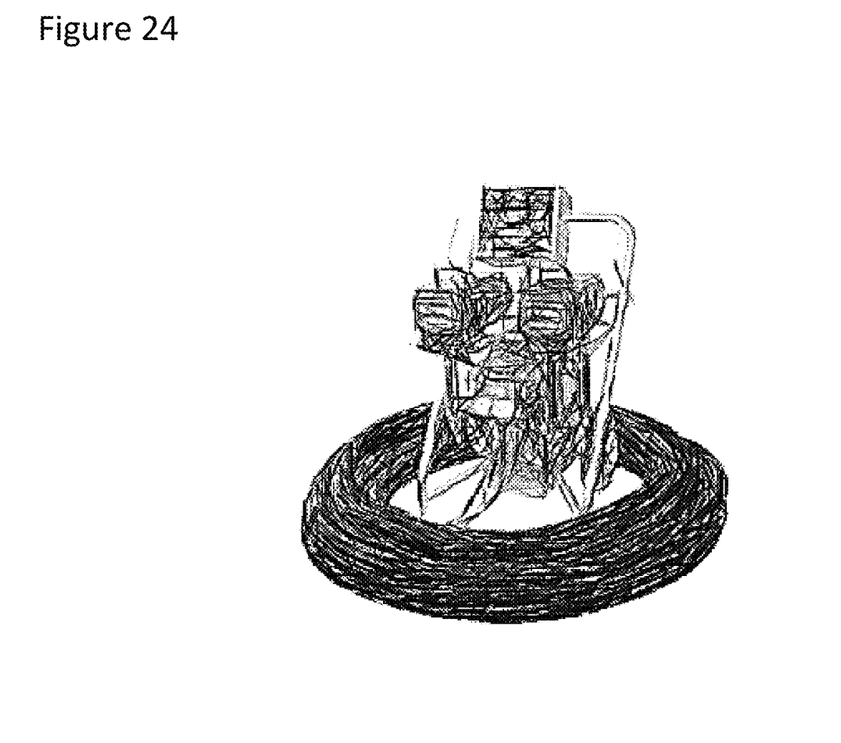
FIG. 24 shows an example of an SPF machine more commonly known as a proportioner.

When spray polyurethane foam (SPF) insulation is applied to a substrate using an SPF machine (more commonly known as a proportioner FIG. 24) or from a pressurized chemical kit (FIG. 23), in a residential or commercial building (FIG. 7), the thermal R-value architectural requirement for walls/roof/crawlspace etc. is met by spraying to proper depth (thickness) based on type of polyurethane foam used. Typical closed cell polyurethane foam R-value is 7 per inch. As an example, a 2-inch depth therefore results in an R-value=7×2=R14. Application of spray foam insulation however results in a rocky and uneven surface (FIG. 8.) The R-value is therefore based on an average or mean depth between the peaks and valleys (FIG. 9). A minimum depth requirement must also be met. The proper depth is achieved through the sprayers experienced and "calibrated" hand when working with the spray foam application gun. During the application (we call this the dynamic measurement) shown in FIG. 1, the sprayer periodically stops spraying to measure and verify proper depth applied. This is done today using a mechanical method such as a thin depth stick with marked dimensions (FIG. 10). Verification of code compliance is done by a city or county inspector (we call this the static measurement) shown in FIG. 2 using a similar method (FIG. 10). Detriment to this method is that only a limited number of "pokes" can be done due to time constraints. It is inherently subjective on whether you are measuring a peak or valley. The "poke" also leaves a hole or puncture in the foam allowing for thermal weakness and penetration. Our company saw the need and advantage to be gained if measurement of the spray foam depth can be done simultaneous to spraying and comprehensive of an overall area including all peaks and valleys. Thus, we developed a method to measure average depth of foam electronically, and optically on a substrate in a non-destructive format. This method lends itself to dynamic (during the application of foam such as done by the sprayer) and static (following the application of foam such as done by an inspector) measurement application. Knowing the average and mean depth of the applied spray foam substrate allows for another important parameter in the spray foam application field which is material Yield. Material Yield is a similar parameter to miles per gallon (MPG) in automotive terminology. In the spray foam insulation field this is measured in a unit called board feet (bf). In one example we would expect one 55-gallon drum set shown in FIG. 22 (A and B chemical) to Yield a total of 5500 bf. Going further, proper Yield not only allows for a financially successful spray foam job but also tells us something about the proper mix (influenced by pressures, temperatures, flows rates, etc.) between the A and B chemicals due to the simple reason that proper Yield is difficult to achieve with improper application parameters. This is therefore also a quality assurance gage of the spray foam job. Determination of Yield in today's application is a tedious, inaccurate, and time-consuming process. This requires the applicator to measure the number of spray cycles (estimation of liquid volume) processed by the SPF machine (more commonly known as a proportioner) and to estimate the spray foam depth for a determined spray area. A rough calculation can then be performed where basically Yield= (Depth*Area)/Volume. Using an electronic depth and area gage and our specialized software application we can instantaneously calculate Yield during the spray foam application process, eliminating wasted time and improving accuracy of previous methods.

Problem

Figure 11:
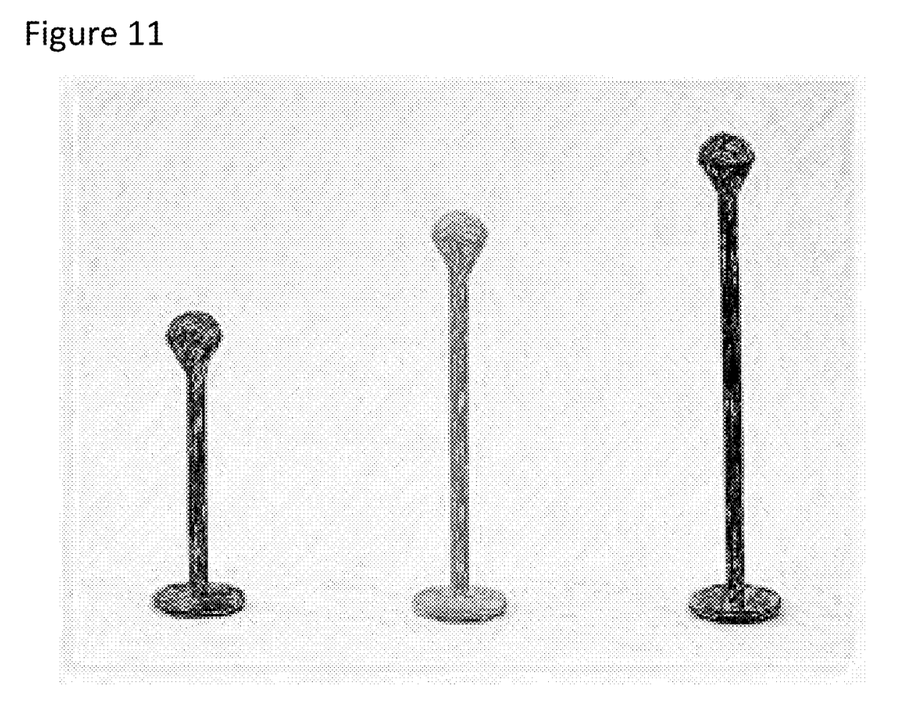
FIG. 11 shows three colored pins with varying lengths used as depth references when applying spray foam.

On the market today, the measurement tool available to applicators and city inspectors is a mechanical depth gage (FIG. 10) There is also a product using a set length colored pin that can be stuck to the substrate prior to applying the spray foam (FIG. 11) If the head of the pin is barely visible this indicates that correct depth was sprayed. Consequently, if body of pin is visible this indicates that depth is too low. The applicator and/or inspector can use this visual aid to determine foam depth at that location. To my knowledge no other method exists on the market today. The method today used for Yield calculation is a manual method using a calculator and estimating the spray foam depth, liquid volume dispensed, and area sprayed. A rough calculation is performed where basically Yield=(Depth*Area)/Volume. This method is unfortunately subjective to manual measurements and thus not reliable and not accurate. The detriment to not having Yield measurements during the application process is that the sprayer does not know of the chemical material losses that he can be prevented by adjusting parameters, etc. until the end of the spray job which unfortunately is then too late.

SUMMARY OF THE INVENTION

Figure 4:
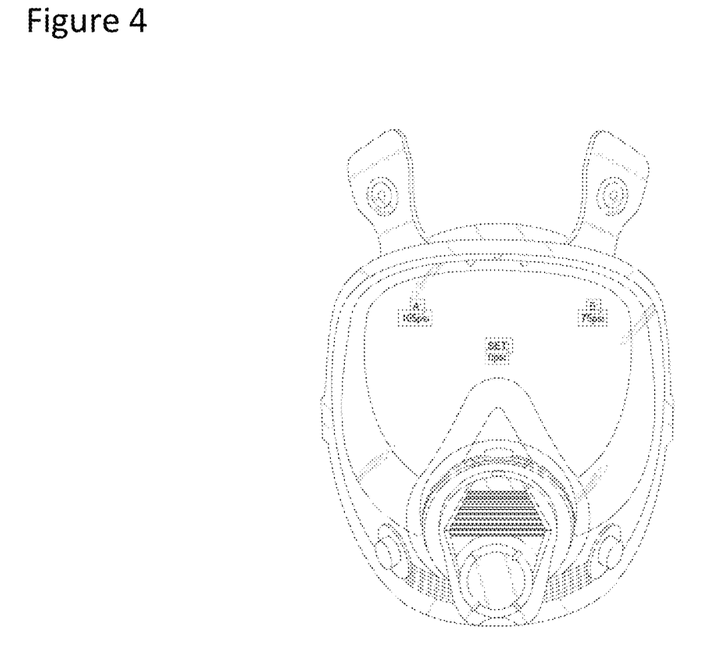
FIG. 4 shows a Smart respirator mask with built in display.
Figure 5:
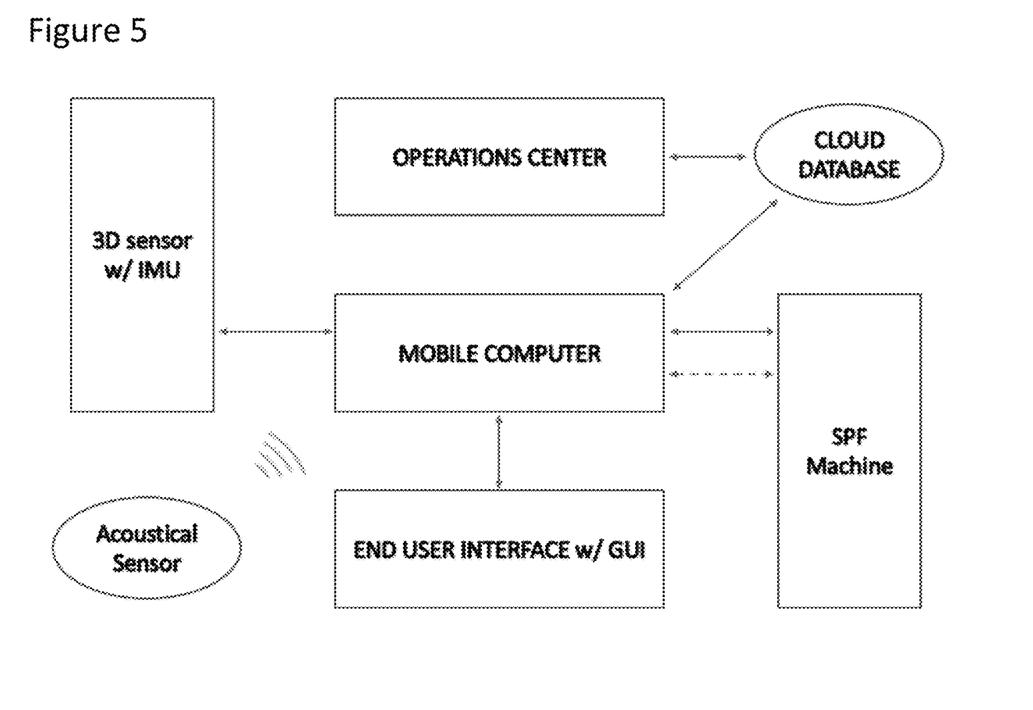
FIG. 5 shows the schematic block diagram of the components found typically in the dynamic measurement using the Smart Spray Foam Depth Sensor system.
Figure 6:
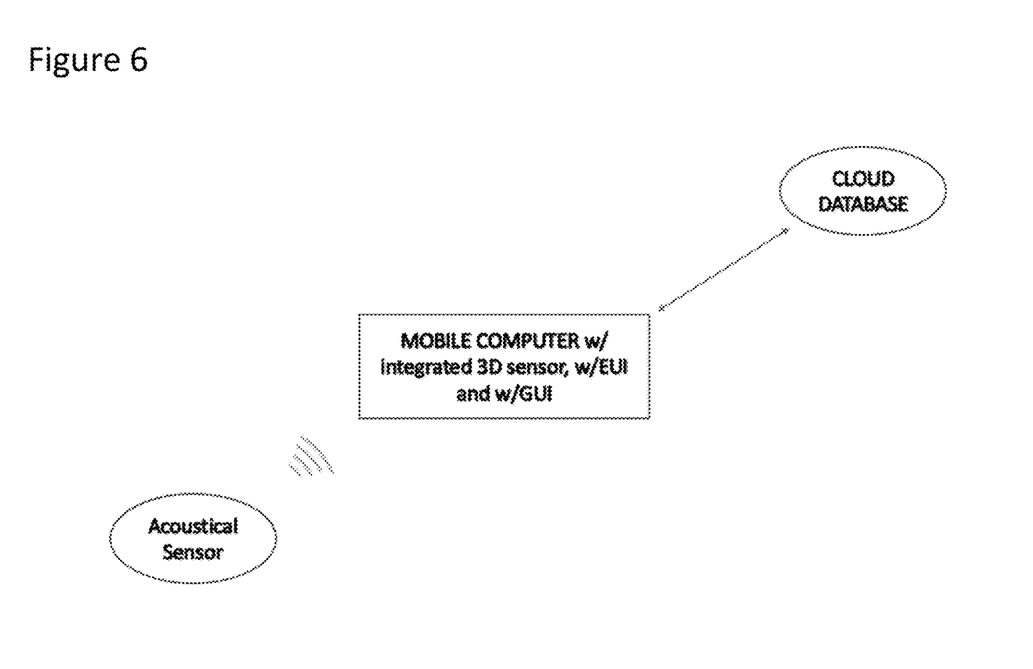
FIG. 6 shows the schematic block diagram of the components found typically in the static measurement using the Smart Spray Foam Depth Sensor system.
Figure 12:
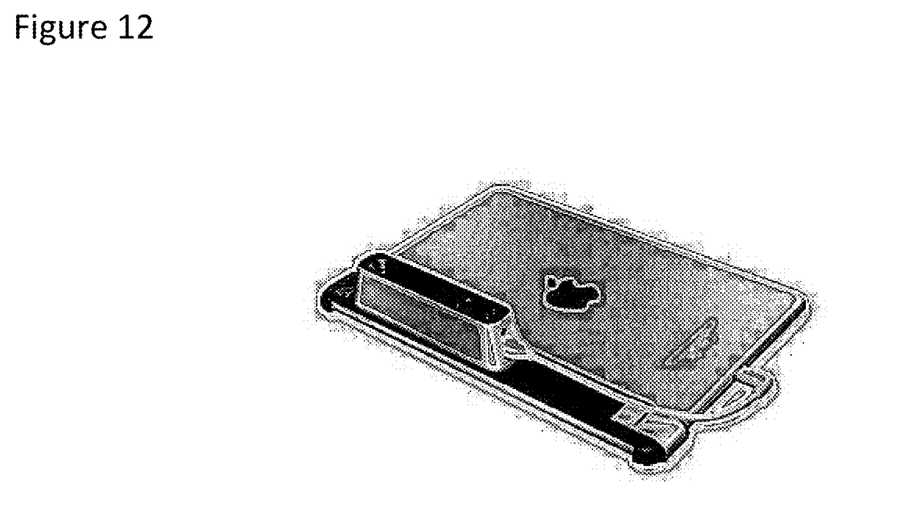
FIG. 12 shows a smart tablet with attached 3D scanning sensor.
Figure 13:
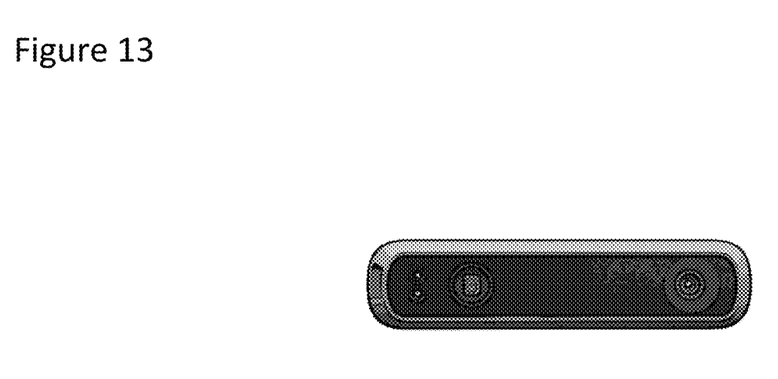
FIG. 13 shows a structured light sensor built by Occipital Inc.
Figure 14:
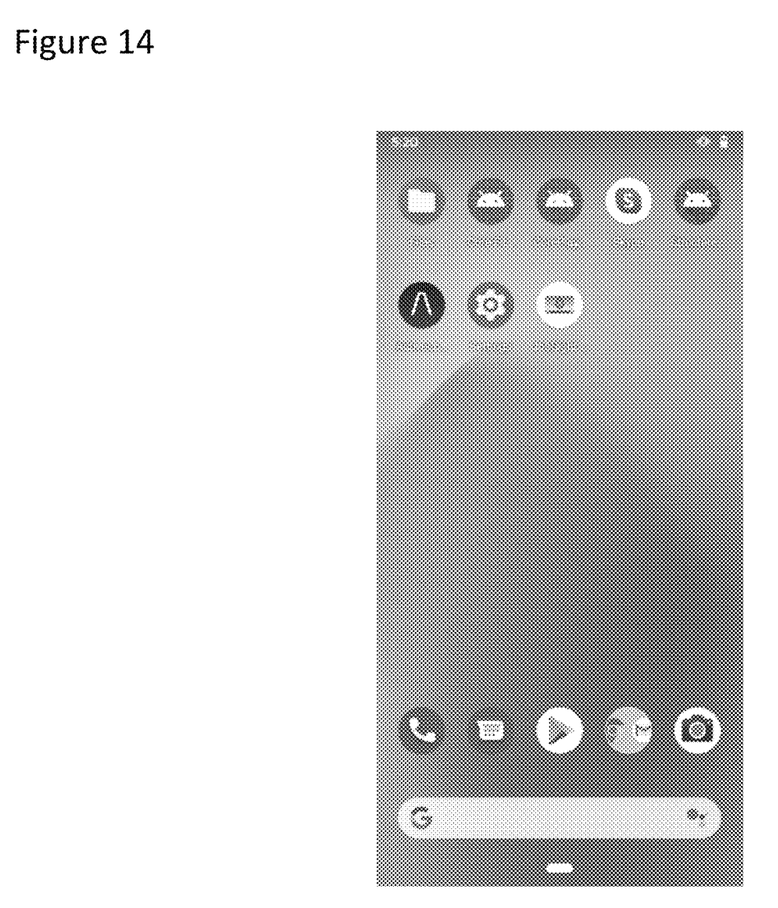
FIG. 14 shows an example of a software application on a mobile device.
Figure 15:
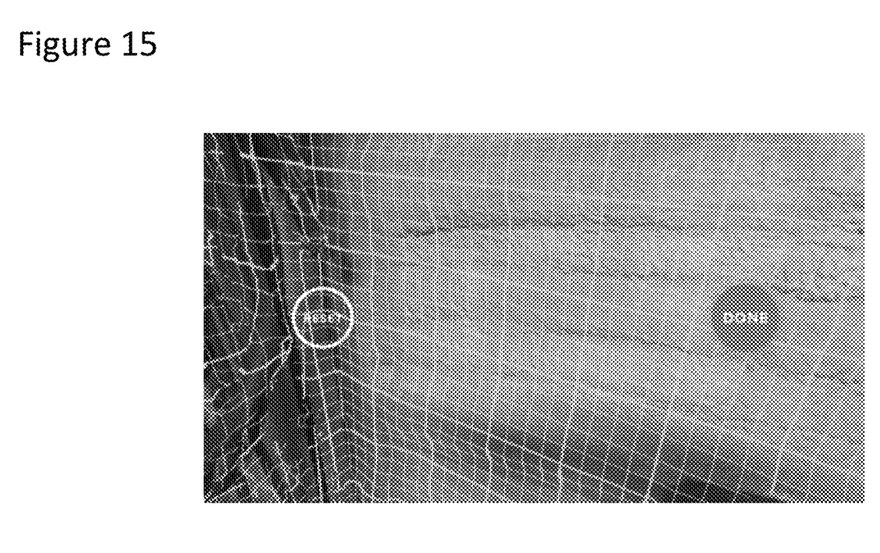
FIG. 15 shows an example of a 3D scan process of a polyurethane foam surface.
Figure 16:
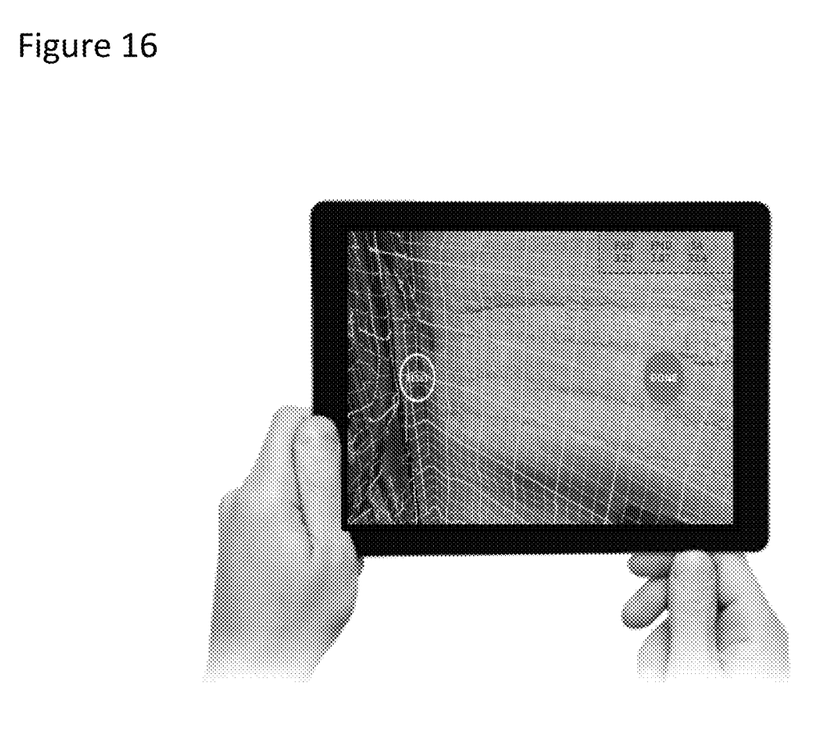
FIG. 16 shows a user interface screen with resulting usable parameters.
Figure 17:
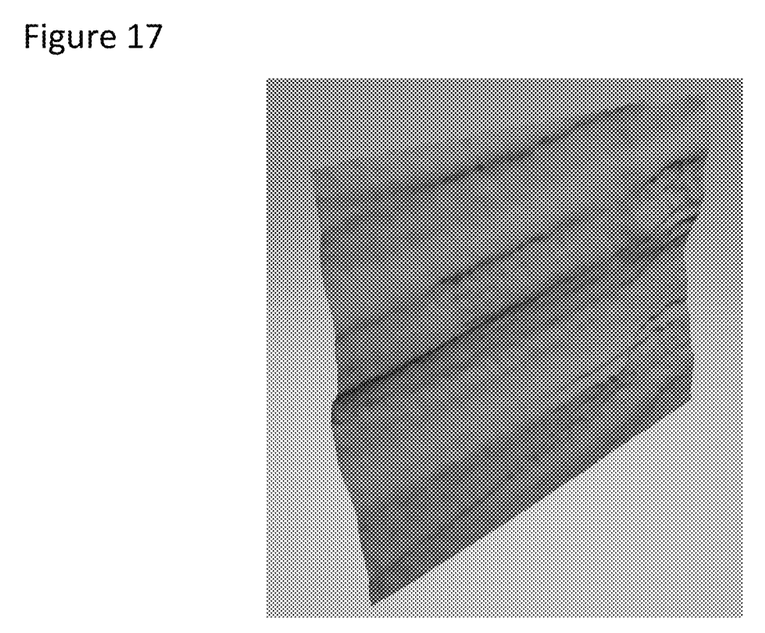
FIG. 17 shows a scanned and saved surface map of a polyurethane spray foam surface.
Figure 18:
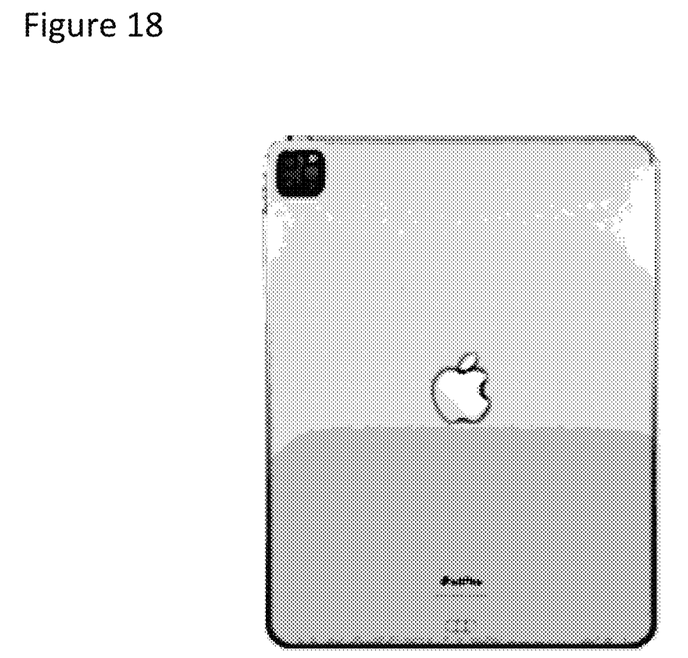
FIG. 18 shows a mobile tablet with LIDAR technology.

Our company built an electronic depth measurement system for measuring depth of foam simultaneous to application of foam (dynamic measurement) built inside the sprayers respirator mask (FIG. 4) or as an inspection tool (static measurement) (FIG. 12). The system has three primary components. The depth sensor (FIG. 13), the software application (FIG. 14), and the processor hardware attached to a user display (FIG. 15) or with an interface for a detached user-display (FIG. 4). The sensor scans the spray foam surface to provide data for a three (3) dimensional map of the area (FIG. 16) called a mesh. The application interacts with the sensor to process the data and continuously calculate average depth of foam applied and the lowest depth detected. The resulting information is displayed on the user-interface display (FIG. 15.) Based on this information the applicator or inspector can decide if the foam meets the depth requirements and therefore the R-value requirements. The processor hardware also can allow for a communication interface to the SPF machine (proportioner) and/or sensors peripheral to the spray foam machine which give an indication of volume of liquid dispensed in real time. In the dynamic measurement, the software application then can calculate instantaneous material Yield based on depth, chemical volume, and surface area. A description of the invention is a non-contact, non-destructive optical and electronic measurement, and computing system for spray foam insulation geometric surfaces for the purpose of performance and quality evaluations. Solution—Our product is the only one on the market which allows for electronic non-contact, non-destructive measurement of the average spray foam depth applied to a substrate. In both dynamic and static measurements, our product also measures the overall area indicating to the user that the measurement was comprehensive of the overall job and not limited to a small section only. The combined data can be viewed on a user interface display such as on a HUD inside the sprayer's respirator mask (in the dynamic measurement) or such as on a tablet (in the static measurement.) In the dynamic measurement, the depth and area data can be combined with chemical volume data from the SPF machine to allow calculation of material Yield. In both the dynamic and static measurements, optical analysis of the spray foam surface allows for additional evaluations relating to quality of the spray foam job (FIG. 20 and FIG. 21) and performance of the spray foam job. Our application allows the above listed functionalities to be performed by a portable device such as a smart phone, tablet, or other portable computer. The portable device can also allow for a cellular interface where the resulting information can be uploaded to a service support center database for further analysis, job support, reporting, or historic archives.

DETAILED DESCRIPTION OF INVENTION

Figure 3:
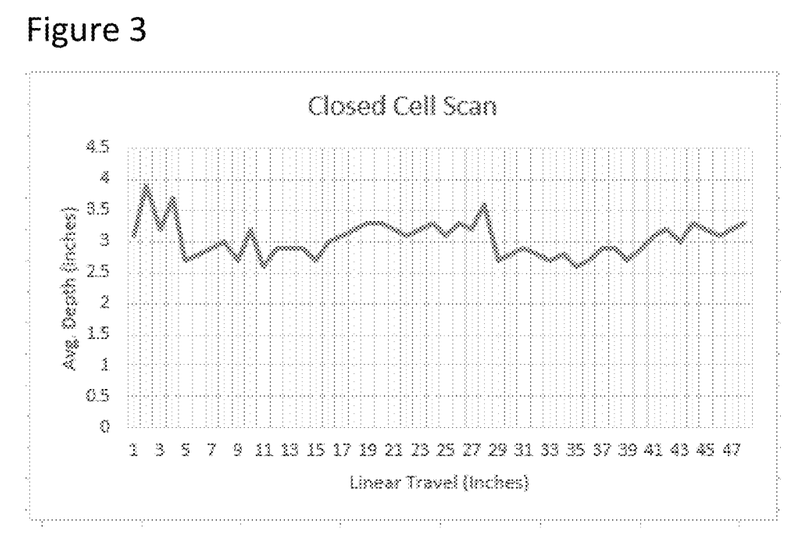
FIG. 3 shows an example of a historic graph used to show depth variation of a previously scanned surface.
Figure 19:
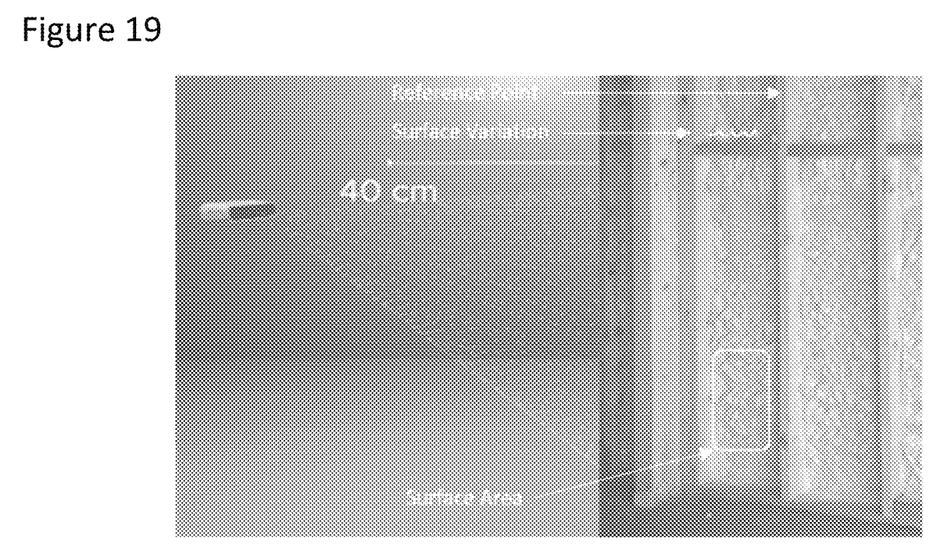
FIG. 19 shows a graphical representation of key measurements used to derive usable parameters.
Figure 20:
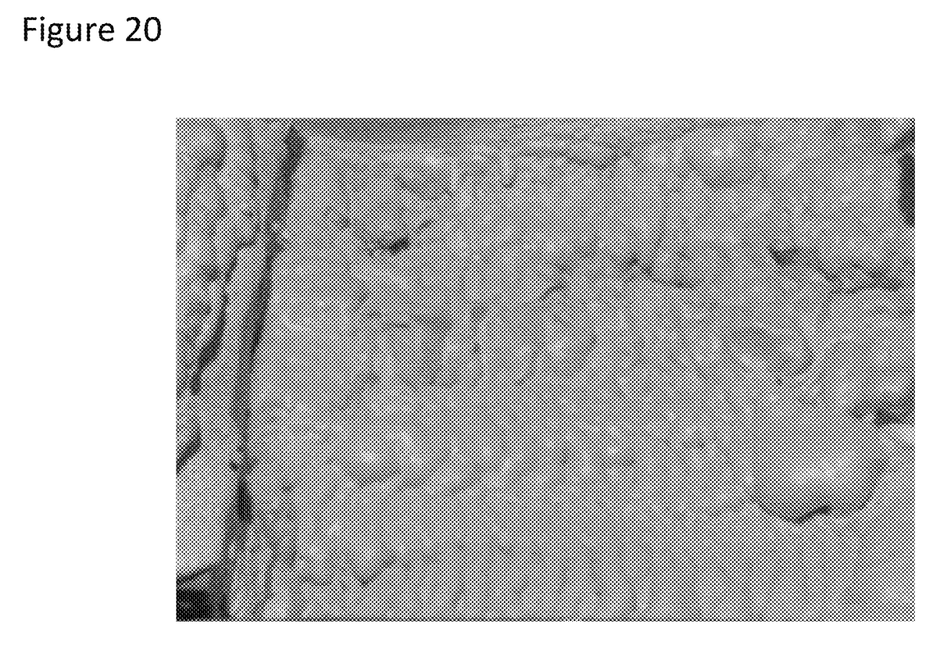
FIG. 20 shows an example of suspect SPF substrate exhibiting suspect color and surface variation.
Figure 21:
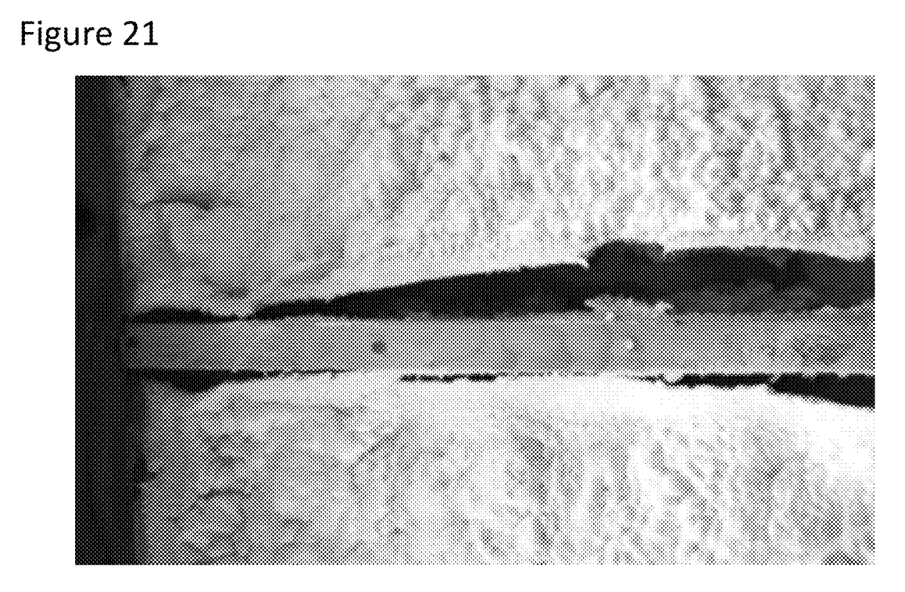
FIG. 21 shows an example of suspect SPF substrate exhibiting shrinkage as identified through geometric variation.

The Smart Spray Foam Depth Sensor system consists of 3 main components: The 3D sensor, the software application, and the end-user-interface. The three (3) dimensional scanning sensor can use multiple technologies for its functionality. Most consumer-based 3D scanning sensors rely on one of five methods: photogrammetry, structured light, laser triangulation, RGB-D, or Time-of-Flight (ToF) technology. Each method has its plusses and minuses. In general, photogrammetry is fastest with lowest barrier to entry. Structured light and laser triangulation provide highest resolution and detail. RGB-D and ToF provide a good mix of speed and cost, although with lower resolution. One application using the ToF is LIDAR (Light Detection and Ranging.) First used on the Apollo 15 mission in 1971 to map the surface of the moon, it is now found in some high-end mobile electronics such as tablets. In the said invention we chose to use a structured light sensor with integrated Inertial Measurement Unit (IMU.) Our software application integrates with the sensor functionality to "read" the data for the purpose of creating a three-dimensional mesh. Our software application written in Java with functions written in C++ continuously evaluates the scanned surface map (FIG. 19.) Using functions to communicate and retrieve data from the sensor, the application creates a three-dimensional mesh of coordinates and vertices. The application then evaluates this data to determine the reference planes of the current mesh. For practical purposes, we focus on two key planes: the plane of the stud framing structure and the plane of the virgin substrate structure. We then extract 3 key metrics types: reference points, surface variations and surface area. Using these key metrics, we calculate the usable parameters for the user. These usable parameters are foam mean depth (FMD), foam minimum depth (FmD) and surface area (SA.) One example calculation for FAD is (Known Stud dimension−(reference point−average surface distance)). (FIG. 19) Therefore for a 2×6 stud with a reference point of 12 inches, an average surface distance of 14 inches and a maximum surface distance of 16 inches the resulting FMD is 3.5 inches. The FmD is 1.5 inches. We refer to the FMD as a performance metric of the SPF substrate. To give proper weight to each coordinate, our algorithm filters specific mesh points to be used in our calculations. For example, each area of the mesh as seen in a two-dimensional plane parallel to the reference plane, contains the same number of usable filtered coordinates regardless of how many coordinates exist in the three-dimensional mesh of each area. In a static method (for example as used by an inspector) FIG. 2, the three usable parameters are displayed onto the end user interface FIG. 16. Values begin to display upon START of scan, continue to update during scan and continue displaying final values upon STOP of scan. After STOP of scan, a historic graph is also shown to give user a variation of the total scan (FIG. 3.) In a dynamic method, both reference planes are used in the calculation of depth to improve accuracy. In the dynamic method, when the portable computer is equipped with an interface to the SPF machine, the portable computer application also calculates and displays the material Yield calculated based on the surface area in a two-dimensional plane parallel to the reference plane, the chemical volume consumed and the FMD. In both the dynamic and static methods, the surface texture of the mesh is analyzed for known geometric variations representative of suspect negative quality criteria such as shown in FIG. 20 and FIG. 21. This evaluation is most valuable in the dynamic method, where the SPF substrate is analyzed as it is changing between liquid phase, semi-solid phase, and solid phase. A key parameter where we focus is the expansion and contraction during this transition. Another option in the dynamic application is the use of a wireless acoustic sensor to capture and transmit in real time the acoustic signature of the SPF substrate during the curing process. This signature is analyzed against known acceptable and suspect acoustic signatures of similar chemical composition SPF applications. Resulting data from the optical and acoustic evaluation and received data from the SPF machine can be sent by the portable computer via cellular to the offsite support center (operations center.) The support center (SC) can be made up of a central computer capable of receiving data from multiple sprayers at multiple sites equipped with the evaluation system. The SC can also have support personnel. In some cases, the central computer can be capable of receiving data such as volumes, cycles, flow rates, temperatures, pressures, and ratios via cellular from the SPF machines in the field if machine is so configured. Using the evaluation system data and the SPF machine data, the central computer can evaluate the information against its extensive archives to advise the sprayer on possible concerns and improvements which can be made via parameter changes. The support personnel are also available to perform the same evaluation process as the central computer and/or to validate the findings of the central computer and report the information to the sprayer and portable computer electronically or through phone support when necessary. In some cases, the parameter improvement modifications from the SC can be acknowledged by the sprayer to be automatically sent to the SPF machine via local or cellular network. Similar scanning functionality can be achieved using other brands and types of scan sensors. Similar functionality can be achieved using other operating systems such as Android or Windows. Similar functionality can be achieved using iOS tablets, Android tablets, MS surface tablet or even laptop or desktop computers. In the case of the dynamic method, similar functionality can be achieved using a micro-display, other see-thru displays (i.e. Google Glass), or a projection display directly onto the face-shield.

One Example of Intended Use

Indented use is for each spray foam rig to contain a Smart Spray Foam Depth Sensor system. The sprayer can use the static system to verify that his work meets the average depth requirements and flag substrate quality concerns at the end of each job of applying spray foam insulation in residential and commercial buildings. Similarly, the sprayer can use the dynamic system installed inside a respirator mask to monitor the average depth of the foam that he is spraying in real time, as well as monitor possible substrate quality concerns identified by the system or by the offsite support center.

The invention claimed is:

1. A portable wireless Spray Polyurethane Foam substrate measurement and evaluation system for a Spray Polyurethane Foam substrate comprising:
   a) an optical sensor measuring a three-dimensional map, with data stream interface to a portable computer,
   b) the portable computer with an end user interface connection,
   c) the end user interface allowing viewing of data and/or parameters and user interaction,
   d) a software application for the portable computer configured to retrieve data from the optical sensor to create a three-dimensional mesh of the Spray Polyurethane Foam substrate, for the purpose of evaluating performance and/or quality of substrate.

2. The portable wireless Spray Polyurethane Foam substrate measurement and evaluation system according to claim 1, in a Dynamic method, where the portable computer has an interface to a Spray Polyurethane Foam machine, to simultaneously read machine data parameters including chemical volume cycles, for the purpose of combining this data with a substrate geometric parameter data to calculate and provide user information including chemical material Yield, and/or the data parameters at the point of use.

3. The portable wireless Spray Polyurethane Foam substrate measurement and evaluation system according to claim 2 where the portable computer has a cellular data interface capable of importing and exporting data to/from an offsite service support center database for the purpose of further analysis, job support, reporting, and historic archives and/or providing user with performance and quality information relating to the Spray Polyurethane Foam substrate at the point of use.

4. The portable Spray Polyurethane Foam substrate measurement and evaluation system according to claim 3 where the offsite service support center allows for an evaluation using the Spray Polyurethane Foam machine data along with the Spray Polyurethane Foam optical sensor data to provide user with performance and quality improvement support at the point of use and to record said data for reporting and archives.

5. The portable wireless Spray Polyurethane Foam substrate measurement and evaluation system according to claim 4 where the offsite service support center has capability of sending Spray Polyurethane Foam machine parameter modifications summary allowing a user to implement modifications manually or to acknowledge automatic modifications of parameters to the Spray Polyurethane Foam machine at the point of use as recommended by the offsite service support center.

6. The portable wireless Spray Polyurethane Foam substrate measurement and evaluation system according to claim 1 where the portable computer has an interface to an acoustical sensor inserted into the full rise Spray Polyurethane Foam substrate for the purpose of evaluation of acoustic signature of Spray Polyurethane Foam curing process for the purpose of evaluating quality of the Spray Polyurethane Foam substrate.

7. The portable wireless Spray Polyurethane Foam substrate measurement and evaluation system according to claim 1, in a Static method, where the portable computer has a cellular data interface capable of importing and exporting information relating to the Spray Polyurethane Substrate to/from an offsite service support center database for the purpose of further analysis, job support, reporting, and historic archives.

8. A portable wireless Spray Polyurethane Foam substrate measurement and evaluation system for a Spray Polyurethane Foam substrate comprising:
   a) a portable computer with integrated LIDAR sensor and integrated end user interface,
   b) a software application configured to retrieve data from the LIDAR sensor to create a three-dimensional mesh of a Spray Polyurethane Foam substrate, for the purpose of evaluating performance and/or quality of substrate,
   c) a cellular interface allowing for upload of result data to an offsite service support center database for the purpose of reporting and archives.

* * * * *